United States Patent [19]

Bandoh

[11] 4,169,299
[45] Oct. 2, 1979

[54] APPARATUS FOR CLEANING PARTING SURFACES OF PLASTIC MOLDS

[75] Inventor: Kazuo Bandoh, Kyoto, Japan

[73] Assignee: Dai-Ichi Seiko Co., Ltd., Japan

[21] Appl. No.: 775,024

[22] Filed: Mar. 7, 1977

[30] Foreign Application Priority Data

Mar. 8, 1976 [JP] Japan ................................ 51-25771

[51] Int. Cl.² ............................................. B29F 1/03
[52] U.S. Cl. .................................... 15/312 R; 15/345;
164/158; 425/DIG. 116
[58] Field of Search ...................... 15/312 R, 345, 346,
15/383, 394, 395; 164/158; 425/228, DIG. 116

[56] References Cited

U.S. PATENT DOCUMENTS

| | | | |
|---|---|---|---|
| 1,578,188 | 3/1926 | Burton | 15/312 X |
| 1,999,667 | 4/1935 | Smellie | 15/346 |
| 2,246,036 | 6/1941 | Farrell | 15/394 X |
| 2,615,192 | 10/1952 | Morell | 15/394 X |
| 2,974,379 | 3/1961 | Mills | 425/DIG. 116 |
| 3,690,801 | 9/1972 | Hutz et al. | 425/DIG. 116 |

*Primary Examiner*—Christopher K. Moore
*Attorney, Agent, or Firm*—Jones, Tullar & Cooper

[57] ABSTRACT

An apparatus for cleaning parting surfaces of plastic molds, which ensures complete and efficient removal of the flash adhered to the parting surfaces of the mold. The cleaning apparatus comprises a carriage reciprocatably mounted on a supporting assembly, and cleaning means mounted on the carriage. The cleaning means comprises a pair of cleaning heads each comprising a spaced pair of air blasting members and a rotary brush arranged between said air blasting members, both of which are provided in the head body. The air blasting members blast the air against the respective parting surfaces of the mold sections, and the rotary brushes remove the flash from the respective parting surfaces. The removed flash dust is sucked up and collected by a dust collecting member provided in the head body and connected to suction means.

4 Claims, 7 Drawing Figures

APPARATUS FOR CLEANING PARTING SURFACES OF PLASTIC MOLDS

This invention relates to an apparatus for cleaning parting surfaces of plastic molds. More particularly, it relates to an apparatus for removing flash adhered to parting surfaces of thermosetting plastic molds to keep said surfaces clean during molding.

In the thermosetting plastic industry, the removal of the flash adhered to parting surfaces of the mold has long been a problem. In compression molds, the closing or telescoping of two mating sections of the mold results in the formation of flash, because of flow of the molding material into the clearance between these sections. Although the formation of flash may be greatly decreased by the use of a transfer or injection mold, it is very difficult to completely avoid the presence of flash. Most the flash is removed from the parting surfaces of the mold by the removal of the mold piece, but frequently, some of the flash is left on said parting surfaces. If any flash is left on the parting surfaces of the mold, the material would flash excessively during the next molding cycle. Worst of all, flash remaining adhered to the mold partng surfaces tends to cause damage to the mold as a result of localized, unbalanced clamping pressure. Accordingly, it is necessary that the parting surfaces of the mold are cleaned between successive shots.

Historically, the cleaning of the parting surfaces of molds has been carried out manually after every shot, for example, by rubbing off the flash from the parting surfaces with a copper spatula. However, this work exposes an operator to danger since the mold is preheated to a high temperature of 160° to 200° C. Furthermore, if the molding material is a thermosetting plastic having high adhesion, such as an epoxy, it is very difficult to efficiently remove the flash from the parting surfaces of the mold. It is also difficult to maintain a no-dust condition around the molding press during operation, because of scattering of the removed flash dust.

It is therefore an object of the present invention to provide an apparatus for cleaning parting surfaces of plastic molds which is capable of removing the flash adhered to the parting surfaces of the mold with safety.

Another object of the present invention is to provide an apparatus for cleaning parting surfaces of plastic molds which ensures complete and efficient removal of the flash adhered to the parting surfaces of the mold.

Still another object of the present invention is to provide an apparatus for cleaning parting surfaces of plastic molds which makes it possible to maintain a no-dust condition around the molding press.

A further object of the present invention is to provide an apparatus for cleaning parting surfaces of plastic molds which is simple in construction and easy to maintain.

The apparatus of the invention may be employed in a method for cleaning parting surfaces of plastic molds which comprises the steps of blasting air against the parting surfaces of the mating sections of the mold to make it easy to remove the flash adhered to said surfaces, brushing off said flash from the parting surfaces, and sucking up and collecting the removed flash dust.

An apparatus according to the present invention comprises a carriage reciprocatably mounted on a supporting assembly, with cleaning means mounted on said carriage, said cleaning means comprising a pair of cleaning heads arranged in parallel, and driving means; each of said cleaning heads comprising a head body attached one end to the carriage, a spaced pair of air blasting members arranged in the free end portion of the head body and connected to a compressed gas source for cooling and blowing off the flash adhered to said parting surfaces, a rotary brush arranged between said air blasting members for brushing off the flash from said parting surfaces, and a dust collecting member housed in said head body and connected to suction means, for collecting the removed flash dust.

According to the preferred embodiment of the present invention, the cleaning heads are mounted on the carriage so as to be reciprocated left and right.

The above objects, features and advantages together with others of the present invention will be further apparent from the following description with reference to the several figures of the accompanying drawings.

Referring now to the drawings, it will be seen that a cleaning apparatus for parting surfaces of plastic molds comprises a supporting assembly 1 and a carriage 2 provided with cleaning means 3.

The supporting assembly 1 comprises a supporting plate 4 supported by guide bars 5. The guide bars 5 are respectively inserted in bushings 6 at free ends thereof and fixed in position by slotted nuts 7. An elevating screw 5a is fixed one end to the supporting plate 4 and engaged with a worm gear 8 at the other end. A worm of the worm gear 8 is attached to a shaft of a bandwheel 9 for adjusting the height of the cleaning means 3. Mounted on the supporting plate 4 by reinforced L-shaped members 10 is a pair of guide rails 11 extending forwardly over the front end of the supporting plate. Means for reciprocating the carriage 2 is mounted on the supporting plate 4 in parallel with guide rails 11. The driving means comprises a cable cylinder 12, each cable 13a, 13b, fixed to a piston at one end, is connected to a carriage 2 via sprockets 14 attached to the supporting plate 4. Instead of the cable cylinder 12, any type of cylinder such as on air cylinder, hydraulic cylinder may be employed. By the reciprocating motion of the piston, the carriage 2 is driven forth and back. The forward and backward movements of the carriage are changed by actuating limit switches $SW_1$ and $SW_2$ provided to the supporting plate 4 and connected to a control unit for the apparatus. The limit switches $SW_1$ and $SW_2$ are actuated by a roller 15 provided to the carriage 2.

Figure 1:
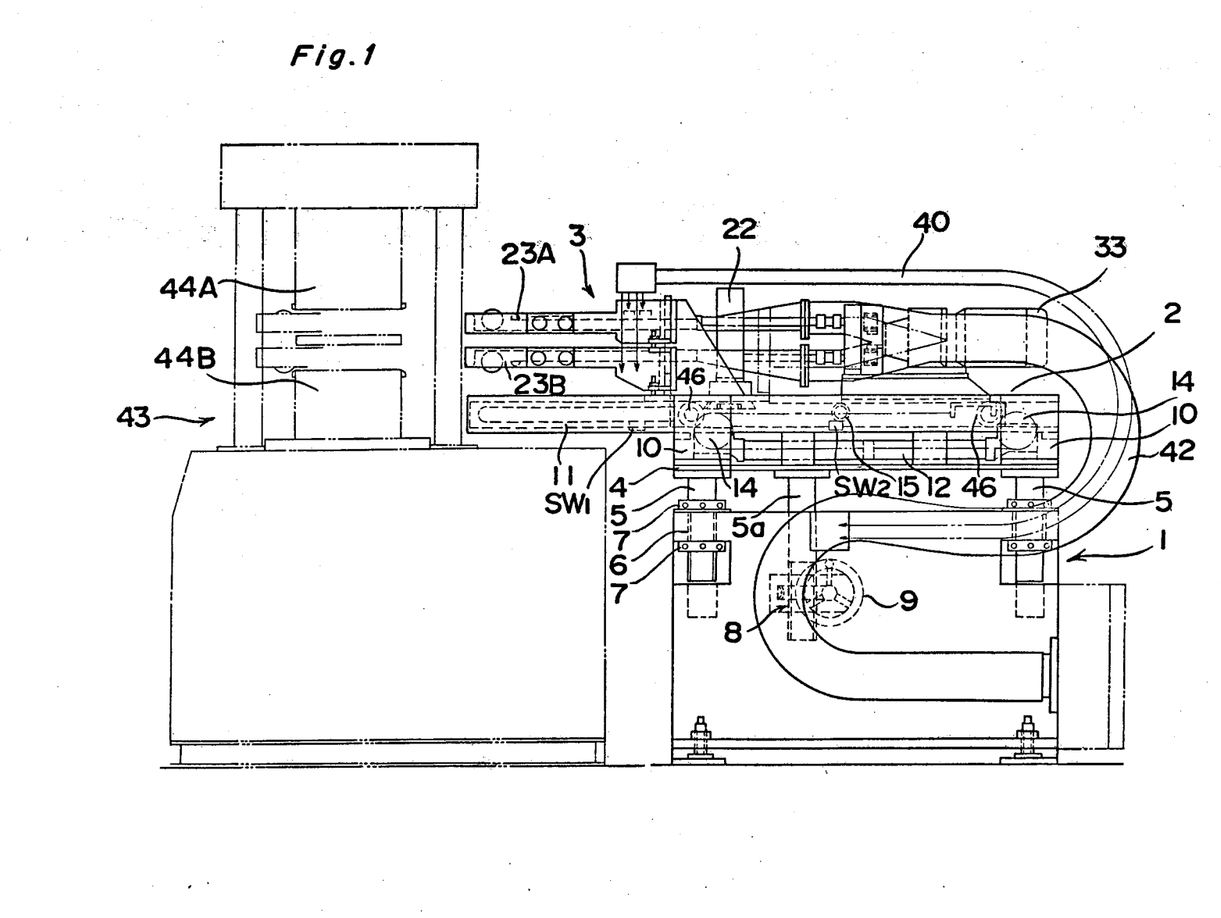
FIG. 1 is a schematic side elevational view of a cleaning apparatus for parting surfaces of plastic molds embodying the present invention, arranged at a side of a molding press.
Figure 2:
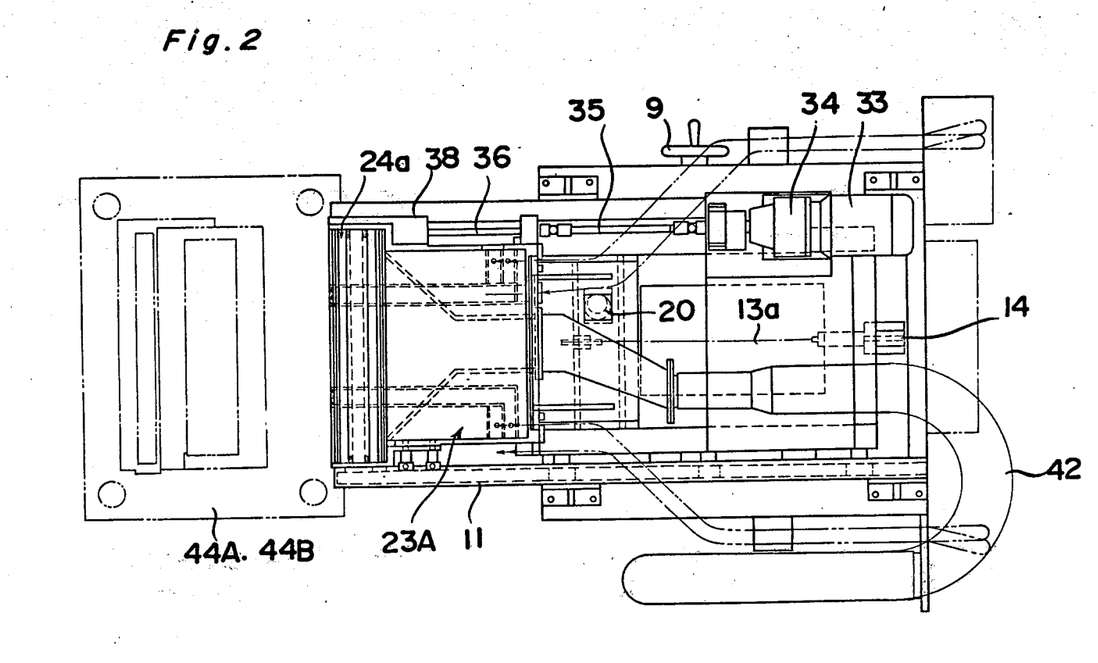
FIG. 2 is a plan view of FIG. 1.
Figure 3:
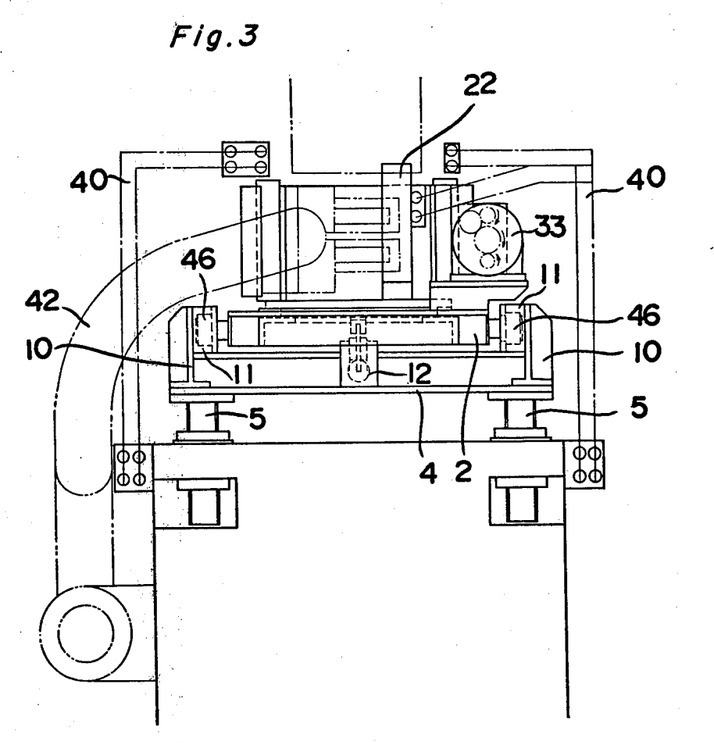
FIG. 3 is a rear elevation of FIG. 1.
Figure 4:
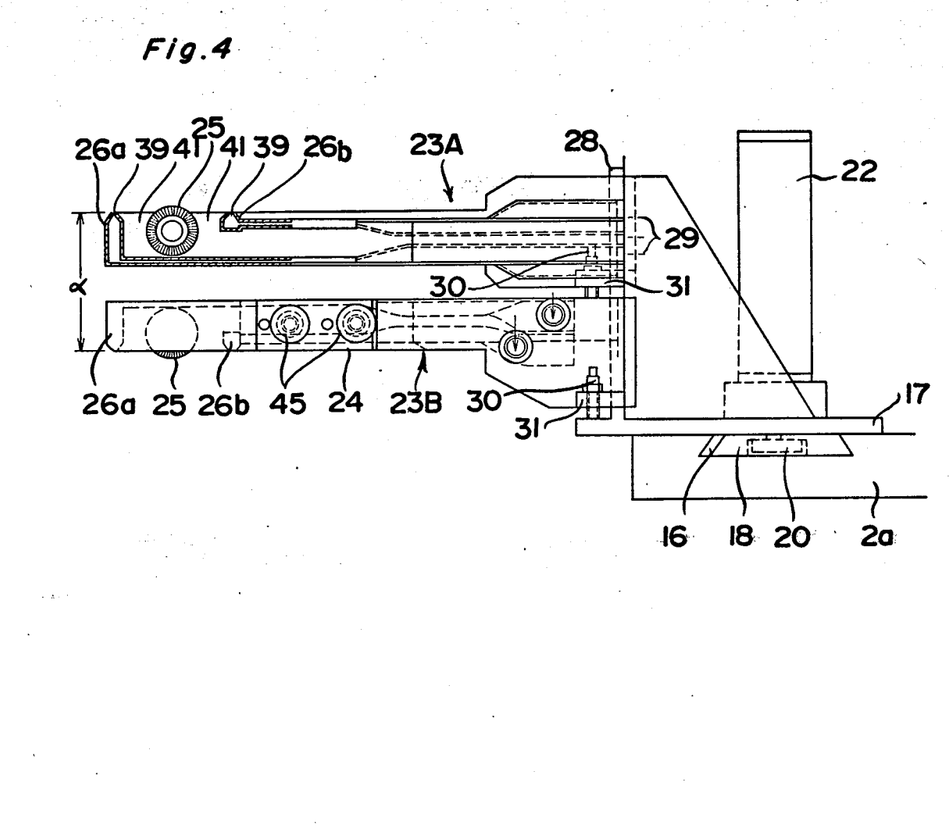
FIG. 4 is an enlarged side elevational view in section, of an essential portion of the apparatus shown in FIG. 1.
Figure 5:
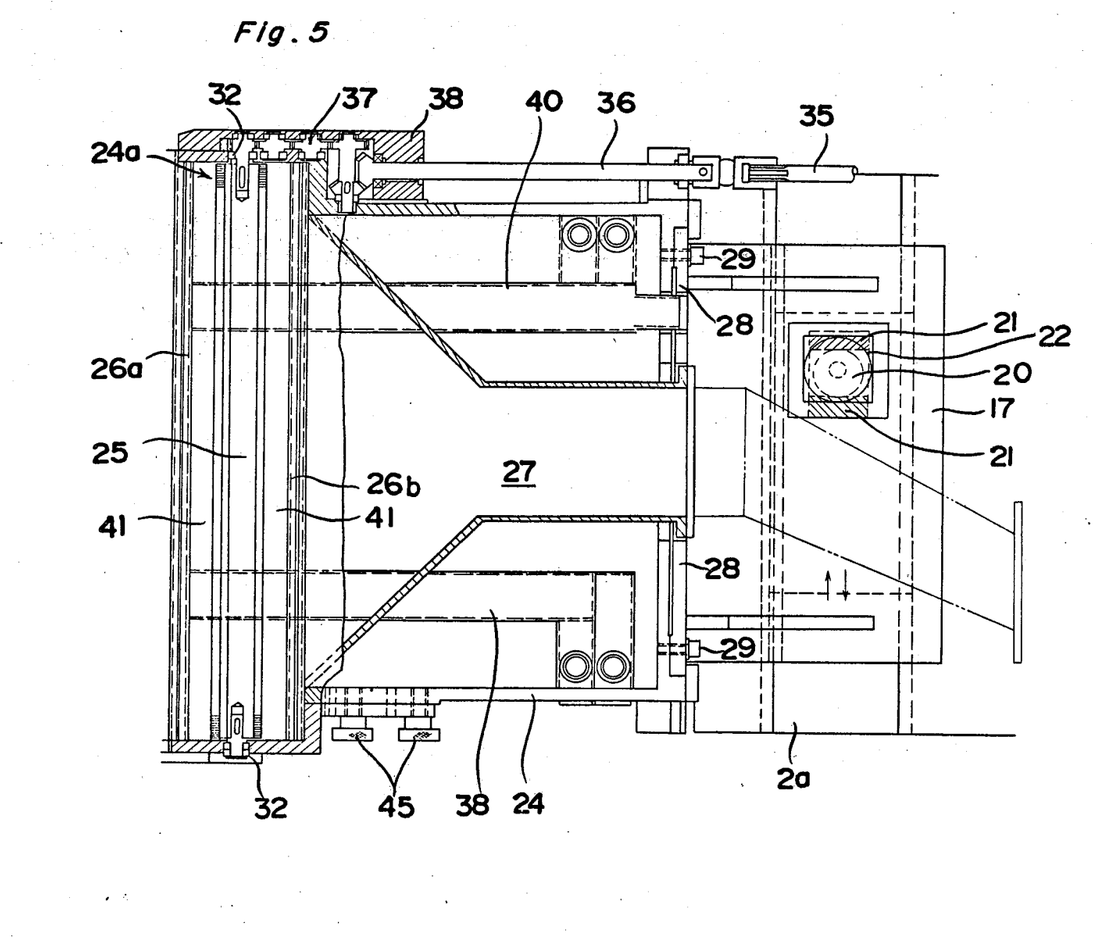
FIG. 5 is a plan view in section of FIG. 4.
Figure 6:
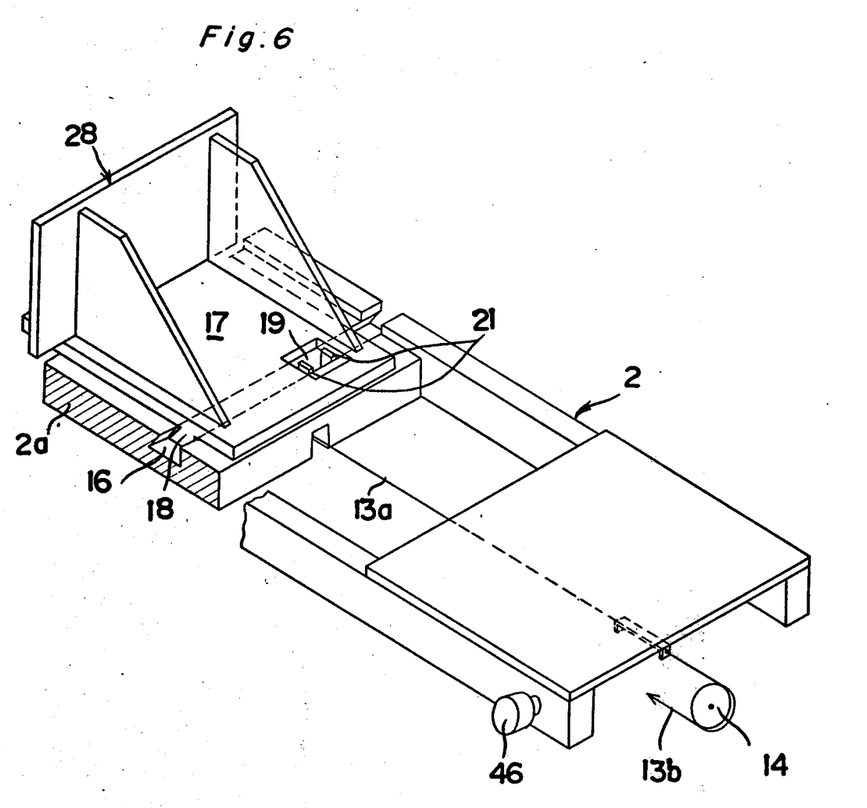
FIG. 6 is a partially sectional schematic perspective view showing a carriage employed in the cleaning apparatus of FIG. 1.
Figure 7:
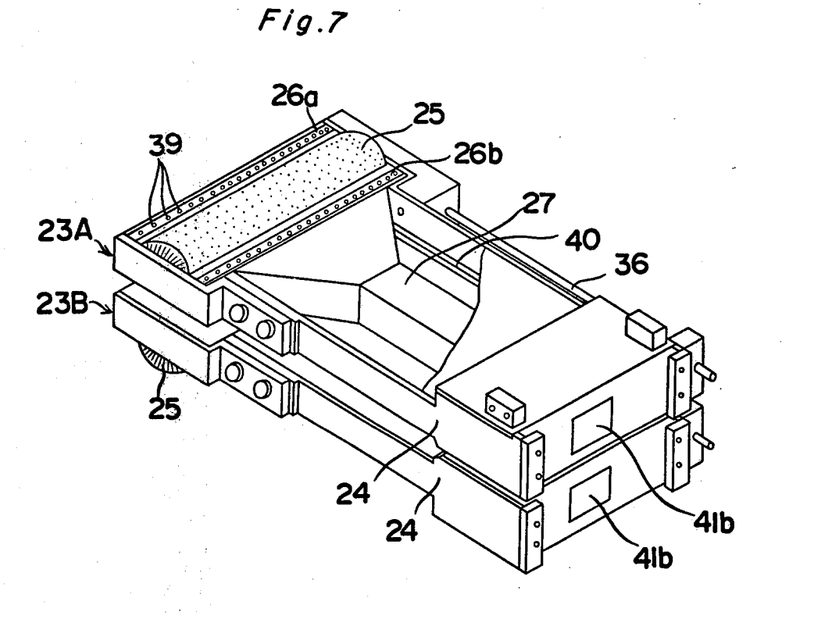
FIG. 7 is a partially sectional shematic perspective view showing an essential portion of the apparatus of FIG. 1.

The carriage 2 is supported and guided by the guide rails 11, and wheels 46 are engaged with guide ways of the rails. As best seen from FIG. 6, the carriage 2 is provided with a dovetail groove 16 at its front plate 2a on which a movable plate 17 is slidably mounted. The movable plate 17 is provided with a dovetail 18 which is dovetail into the groove 16. The movable plate 17 is provided with an opening 19 through which an eccentric cam 20 is inserted between projecting guides 21 provided in the dovetail groove 16. The eccentric cam 20 is attached to an electric motor 22 stationary mounted on the movable plate 17. When the cam 20 is rotated by the motor 22, the movable plate 17 vibrates or reciprocates left and right. The means for vibrating the movable plate 17 may be an air vibrator, but this means is not always required to remove the flash adhered to parting surfaces of the mold.

The cleaning means 3 comprises a pair of cleaning heads 23A and 23B arranged horizontally and parallel on different levels, each of which comprises a head body 24, a cylindrical rotary brush 25, a pair of air blasting members 26a and 26b, and a dust collecting member 27. The head body 24 is attached one end to a reinforced attachment plate 28 fixed to the movable plate 17, by fine adjusting means comprising clamping bolts 29, bolts 30 for finely adjusting the distance between two cleaning heads 23A and 23B, and brackets 31. The hollow head body 24 is provided with a rectangular opening 24a at the upper or lower side of the free end portion thereof, which is connected to the dust collecting member 27 housed in the head body.

The rotary brush 25 horizontally supported by bearings 32 is housed in the free end portion of the head body 24 so that bristles 25a thereof are partially projected outwardly from the opening 24a. The rotary brush 25 is arranged between a spaced pair of air blasting members 26a and 26b provided in the free end portion of the head body 24 in parallel with the brush 25. The air blasting members 26a and 26b are provided with a plurality of air blasting nozzles or slits 39 along the entire length thereof and connected to a compressed gas source such as an air compressor (not shown) via a duct or hose 40. Nozzles or slits for blasting air against the parting surfaces may be provided along the entire edge of the opening 24a. The clearances 41 between the rotary brush 25 and air blasting members 26a and 26b from flash dust suction ports of the dust collecting member 27, the outlet 41b of which is connected to suction means such as a suction fan (not shown) via a branched hose 42. The suction means and compressed gas source may be housed in the supporting assembly 1.

The brushes 25 are driven by driving means comprising a motor stationary mounted on the carriage 2, differential reduction gears 34, universal joints 35, driving shafts 36 and gear assembly 37 housed in a gear box 38. Clamp screws 45 are provided on the head body to allow for the changing brushes.

As a material for the bristles of the rotary brush 25, it is preferred to use heat-resisting materials such as, for example, tetrafluoroethylene fibers, fluoroplastic fibers, metal wires, vegetable fibers, etc.

The above cleaning apparatus according to the present invention may be operated in the following manner.

The cleaning apparatus is arranged at the side of a molding press 43. Prior to the operation, the cleaning means 3 is adjusted to a predetermined height by handwheel 9, and the distance between upper and lower cleaning heads 23A and 23B is adjusted in such a manner that the distance $a$ between upper and lower air nozzles 39 is approximately equal to the maximum distance between parting surfaces of upper and lower mold sections 44A and 44B.

When the mold is opened and the molded piece removed from the cavity, the motors 22 and 33 for driving the movable plate 17 and rotary brushes 25, respectively, are started so that the cleaning heads 23A and 23B reciprocate left and right, and the rotary brushes 25 rotate. At the same time, the cylinder 12 for driving the carriage 2 forward is also started. The flash adhered to the parting surfaces of the upper and lower mold sections 44A and 44B are initially cooled by the air from the air blasting members 26a of the upper and lower cleaning heads 23A and 23B, so that a difference in temperature occurs between the flash and parting surfaces, thus making it easy to remove the flash from the parting surfaces. After that, the flash is removed by the rotary brush 25 since the bristles 25a enter into all of the corners and rugged portions of cavity as a result of the rotation and horizontal movements of the brushes 25. The removed flash dust is sucked up and collected through the dust collecting member 27 by the suction means. The flash dust attached to the parting surfaces is blown off by the air from the air blasting members 26b of the upper and lower cleaning heads 23A and 23B. The air blasting members 26a and 26b work together to form air curtains surrounding the rotary brush 25, so that scattering of the flash dust is prevented. When the carriage 2 is moved forward to a predetermined position, the limit switch $SW_1$ is actuated by the roller 15 so that the carriage 2 is driven backward, and the motor 33 is reversed. During the backward movement of the carriage 2, the parting surfaces of the mold sections are subjected to the above cleaning steps so that the flash adhered to the parting surfaces is removed completely therefrom. The cleaning of the parting surfaces may be effected automatically with every shot so that it is possible to prevent the damage of the mold due to the flash, and also possible to produce good molded pieces.

It will be appreciated that it is not intended to limit the invention to only the above example; many variations, such as might readily occur to those skilled in the art, being possible without departing from the scope of the invention.

Thus, for example, the cleaning heads may be arranged vertically and parallel on the same levels in order to adapt the cleaning apparatus to the molding presses of a horizontal type, although the cleaning heads in the above embodiment are arranged horizontally.

Further, in the above embodiment, the cylindrical rotary brushes arranged horizontally are used, but it is also possible to use cupped rotary brushes arranged vertically and rotated about a center axis.

What is claimed is:

1. An apparatus for cleaning plastic flash from mated parting surfaces of a mold between shots comprising:
    (a) a carriage reciprocatably mounted on a support assembly for movement relative to the mold,
    (b) drive means for reciprocating said carriage when the mold is open;
    (c) a pair of cleaning heads mounted on said carriage so as to be moved between the opened mated parting surfaces by the reciprocation of said carriage, said pair of cleaning heads being arranged upon said carriage so that, when they are moved between said opened parting surfaces, one cleaning head contacts one of said parting surfaces while the other head contacts the other of said parting surfaces so as to remove flash adhered to the respective parting surfaces;

(d) each of said cleaning heads comprising:
  (i) a head body provided with a parting surface facing opening,
  (ii) means arranged around the opening, and connected to a compressed air source, adapted to blast air against the contacted parting surface to produce a difference in temperature between the plastic flash and the parting surface and, further adapted to form air cutains to prevent scattering of flash removed from the parting surface during said movement of the cleaning head, said means being provided with a plurality of nozzles or slits through which the air is blasted;
  (iii) driven brush means arranged in said opening, a portion thereof projecting from said opening to contact and brush off the flash from the parting surface, and
  (iv) dust collecting means connected to a suction source and having suction ports formed between said blasting means and brush means adapted to collect the flash removed by said blasting means or said brush means.

2. The apparatus, as in claim 1, wherein the cleaning heads are mounted on a movable means reciprocally mounted on said carriage to provide movement of the cleaning heads transverse to the movement of the carriage.

3. The apparatus, as in claim 1, wherein the cleaning heads are arranged horizontally in different planes.

4. The apparatus, as in claim 1, wherein the cleaning heads are arranged vertically.

* * * * *